US012548127B2

(12) United States Patent
Wu et al.

(10) Patent No.: US 12,548,127 B2
(45) Date of Patent: Feb. 10, 2026

(54) SKIN FLAW REMOVAL IMAGE PROCESSING METHOD AND APPARATUS, ELECTRONIC DEVICE AND COMPUTER READABLE STORAGE MEDIUM

(71) Applicant: BOE TECHNOLOGY GROUP CO., LTD., Beijing (CN)

(72) Inventors: Yanhong Wu, Beijing (CN); Yan Gao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 357 days.

(21) Appl. No.: 18/027,986

(22) PCT Filed: May 23, 2022

(86) PCT No.: PCT/CN2022/094361
§ 371 (c)(1),
(2) Date: Mar. 23, 2023

(87) PCT Pub. No.: WO2023/225774
PCT Pub. Date: Nov. 30, 2023

(65) Prior Publication Data

US 2024/0320806 A1 Sep. 26, 2024

(51) Int. Cl.
*G06K 9/00* (2022.01)
*G06T 5/20* (2006.01)
(Continued)

(52) U.S. Cl.
CPC .................. *G06T 5/77* (2024.01); *G06T 5/20* (2013.01); *G06T 5/50* (2013.01); *G06T 7/0012* (2013.01);
(Continued)

(58) Field of Classification Search
CPC .... G06V 40/171; G06V 40/168; G06V 40/10; G06V 40/161; G06V 40/172;
(Continued)

(56) References Cited

U.S. PATENT DOCUMENTS 9,245,330 B2 * 1/2016 Aoki .......................... G06T 5/94
2004/0130631 A1 * 7/2004 Suh .......................... G06T 5/20
348/222.1
(Continued)

FOREIGN PATENT DOCUMENTS

CN 104318262 A * 1/2015 ......... G06K 9/00241
CN 109003236 A 12/2018
(Continued)

OTHER PUBLICATIONS

Jialiang et al., "Fast Facial Beautification Algorithm Based on Skin Texture Preserving," J. Computer-Aided Design & Computer Graphics, Feb. 28, 2018, vol. 30, No. 2, pp. 336-345.

*Primary Examiner* — Gregory A Morse
*Assistant Examiner* — Kevin M Coomber
(74) *Attorney, Agent, or Firm* — HOUTTEMAN LAW LLC

(57) ABSTRACT

An image processing method, an image processing apparatus, an electronic device, and a computer readable storage medium are provided, and belong to the field of computer technology. The image processing method includes: performing a face detection on a first image to be processed, to determine a face region and face key point information in the first image; performing a skin detection on the first image according to the face region, to determine a skin region in the first image; performing a flaw detection on the skin region according to the face key point information, to determine a flaw region in the skin region; and performing
(Continued)

First image

Related art

Present disclosure a flaw removal processing on the flaw region in the first image to obtain a second image.

18 Claims, 4 Drawing Sheets

(51) Int. Cl.

| | |
|---|---|
| ***G06T 5/50*** | (2006.01) |
| ***G06T 5/77*** | (2024.01) |
| ***G06T 7/00*** | (2017.01) |
| ***G06V 40/16*** | (2022.01) |

(52) U.S. Cl.

CPC .......... *G06V 40/161* (2022.01); *G06V 40/171* (2022.01); *G06V 40/172* (2022.01); *G06T 2207/30088* (2013.01); *G06T 2207/30201* (2013.01)

(58) Field of Classification Search

CPC .... G06V 40/162; G06V 10/443; G06V 10/25; G06T 2207/30088; G06T 2207/30201; G06T 2207/30196; G06T 5/77; G06T 5/00; G06T 11/001; G06T 5/20; G06T 5/50; G06T 7/0012; G06T 7/11; G06T 7/0002; A61B 5/441; A61B 5/0077; G06F 18/00

See application file for complete search history.

(56) References Cited

U.S. PATENT DOCUMENTS

| | | | | |
|---|---|---|---|---|
| 2010/0026833 | A1* | 2/2010 | Ciuc | G06V 40/16 348/222.1 |
| 2013/0329079 | A1* | 12/2013 | Florea | H04N 23/611 348/222.1 |
| 2020/0311386 | A1 | 10/2020 | Velusamy et al. | |

FOREIGN PATENT DOCUMENTS

| | | | | | |
|---|---|---|---|---|---|
| CN | 109325468 | A | | 2/2019 | |
| CN | 109389562 | A | | 2/2019 | |
| CN | 110533648 | A | | 12/2019 | |
| CN | 111985265 | A | | 11/2020 | |
| CN | 112004075 | A | | 11/2020 | |
| CN | 109389562 | B | * | 11/2022 | G06T 5/005 |
| IN | 107103298 | A | | 8/2017 | |
| KR | 20200055884 | A | | 5/2020 | |
| WO | WO-2019014812 | A1 | * | 1/2019 | G06K 9/00228 |
| WO | WO 2021016896 | A1 | | 2/2021 | |

* cited by examiner

SKIN FLAW REMOVAL IMAGE PROCESSING METHOD AND APPARATUS, ELECTRONIC DEVICE AND COMPUTER READABLE STORAGE MEDIUM

TECHNICAL FIELD

The present disclosure relates to the field of computer technology, in particular to an image processing method, an image processing apparatus, an electronic device, and a non-transitory computer readable storage medium.

BACKGROUND

At present, the common beautifying operation includes refining and whitening operation and the like for an entire image. However, flaws such as black nevi, comedonesnes, acnes or the like may exist in a face region, and cannot be removed completely in the beautifying operation for the entire image. If a degree of the refining is increased, textures are easily lost, causing an unnatural distortion.

SUMMARY

The present disclosure is directed to at least one technical problem in the related art, and provides an image processing method, an image processing apparatus, an electronic device, and a non-transitory computer readable storage medium.

In a first aspect, an embodiment of the present disclosure provides an image processing method, including: performing a face detection on a first image to be processed, to determine a face region and face key point information in the first image; performing a skin detection on the first image according to the face region, to determine a skin region in the first image; performing a flaw detection on the skin region according to the face key point information, to determine a flaw region in the skin region; and performing a flaw removal processing on the flaw region in the first image to obtain a second image.

In some implementations, the performing a skin detection on the first image according to the face region, to determine a skin region in the first image, includes: converting the first image into a YCrCb space to obtain a third image; determining a target detection value for the skin detection according to pixel values of pixels of the face region in the third image; determining at least one candidate skin region from the third image, where pixel values of pixels in each candidate skin region satisfy a first limiting condition based on the target detection value; and determining the candidate skin region, connected with the face region, in the at least one candidate skin region as the skin region.

In some implementations, the target detection value includes: a first mean value and a first standard deviation of pixel values of the pixels of the face region in a Cr channel in the third image, and a second mean value and a second standard deviation of pixel values of the pixels of the face region in a Cb channel in the third image.

In some implementations, the performing a flaw detection on the skin region according to the face key point information, to determine a flaw region in the skin region, includes: determining a plurality of binary images corresponding to the first image according to a gray-scale image of the first image and a plurality of preset gray-scale thresholds; determining a second limiting condition for the flaw region according to the face key point information; performing a flaw extraction on each binary image according to the second limiting condition, to obtain a candidate flaw region in each binary image; and classifying candidate flaw regions in the plurality of binary images according to positions of center pixels of the candidate flaw regions in the plurality of binary images, to determine the flaw region in the gray-scale image, where the flaw region includes a center point position and a region size.

In some implementations, the performing a flaw extraction on each binary image according to the second limiting condition, to obtain a candidate flaw region in each binary image, includes: extracting a connected region in any binary image; and determining the connected region satisfying the second limiting condition as the candidate flaw region in the binary image; where the second limiting condition includes at least one of: a color of the connected region being a preset color, a size of the connected region being within a preset size range, a roundness of the connected region being greater than or equal to a roundness threshold, a convexity of the connected region being greater than or equal to a convexity threshold, an eccentricity ratio of the connected region being less than or equal to an eccentricity ratio threshold, or the connected region being positioned in the skin region and outside a five-sense organ region; and the five-sense organ region includes at least one of an eyebrow region, an eye region, a nostril region, a mouth region or an ear region, and the preset color includes black or white.

In some implementations, the determining a second limiting condition for the flaw region according to the face key point information, includes: determining the five-sense organ region in the first image according to the face key point information; and determining the preset size range according to a size of the eye region in the five-sense organ region.

In some implementations, the classifying candidate flaw regions in the plurality of binary images according to positions of center pixels of the candidate flaw regions in the plurality of binary images, to determine the flaw region in the gray-scale image, includes: determining at least one region group according to the positions of the center pixels of the candidate flaw regions in the plurality of binary images, where the candidate flaw regions in each region group belong to different binary images, distances between the center pixels of the candidate flaw regions in the region group are less than or equal to a distance threshold, and a number of the candidate flaw regions in the region group is greater than or equal to a number threshold; determining the center point position of the flaw region corresponding to each region group according to the positions of the center pixels of the candidate flaw regions in the region group; and determining the region size of the flaw region corresponding to each region group according to sizes of the candidate flaw regions in the region group.

In some implementations, the determining the center point position of the flaw region corresponding to each region group according to the positions of the center pixels of the candidate flaw regions in the region group, includes: determining weights of the candidate flaw regions according to inertia rates of the candidate flaw regions in the region group; and determining a weighted sum of the positions of the center pixels of the candidate flaw regions as the center point position of the flaw region corresponding to the region group according to the weights of the candidate flaw regions.

In some implementations, the performing a flaw removal processing on the flaw region in the first image to obtain a second image, includes: determining a flaw frame corresponding to the flaw region and a plurality of adjacent frames adjacent to the flaw frame, where a size of each of the adjacent frames is the same as that of the flaw frame, and the adjacent frames are in the skin region; performing a gradient filtering and gradient calculation on the flaw frame and the plurality of adjacent frames, respectively, to obtain a mean gradient value of the flaw frame and the plurality of adjacent frames; determining a target frame from the flaw frame and the plurality of adjacent frames according to the mean gradient value of the flaw frame and the plurality of adjacent frames; replacing a region image of the flaw frame with a region image of the target frame in response to that the target frame is any adjacent frame; and obtaining the second image in response to that all region images of flaw frames in the first image are replaced.

In some implementations, the performing a gradient filtering and gradient calculation on the flaw frame and the plurality of adjacent frames, respectively, to obtain a mean gradient value of the flaw frame and the plurality of adjacent frames, includes: for any region frame of the flaw frame and the plurality of adjacent frames, performing gradient transverse filtering and gradient longitudinal filtering on a region image of the region frame, to obtain a transverse filtering map and a longitudinal filtering map of the region frame; determining a gradient map of the region frame according to the transverse filtering map and the longitudinal filtering map; and determining a mean value of points in the gradient map as the mean gradient value of the region frame.

In some implementations, before the performing a face detection on a first image to be processed, to determine a face region and face key point information in the first image, the method further includes: displaying a flaw removal control for the first image; where the performing a face detection on a first image to be processed, to determine a face region and face key point information in the first image, includes: performing the face detection on the first image, in response to the flaw removal control being triggered, to determine the face region and the face key point information in the first image In a second aspect, an embodiment of the present disclosure provides an image processing apparatus, including: a face detector configured to perform a face detection on a first image to be processed, to determine a face region and face key point information in the first image; a skin detector configured to perform a skin detection on the first image according to the face region, to determine a skin region in the first image; a flaw detector configured to perform a flaw detection on the skin region according to the face key point information, to determine a flaw region in the skin region; and a flaw remover configured to perform a flaw removal processing on the flaw region in the first image to obtain a second image.

In a third aspect, an embodiment of the present disclosure provides an electronic device, including: at least one processor; a memory for storing at least one program; the at least one program, when executed by the at least one processor, causes the at least one processor to implement the image processing method described above.

In a fourth aspect, an embodiment of the present disclosure provides a non-transitory computer readable storage medium, on which a computer program is stored, the computer program, when executed by a processor, causes the processor to implement steps in the image processing method described above.

DETAIL DESCRIPTION OF EMBODIMENTS

Figure 1:
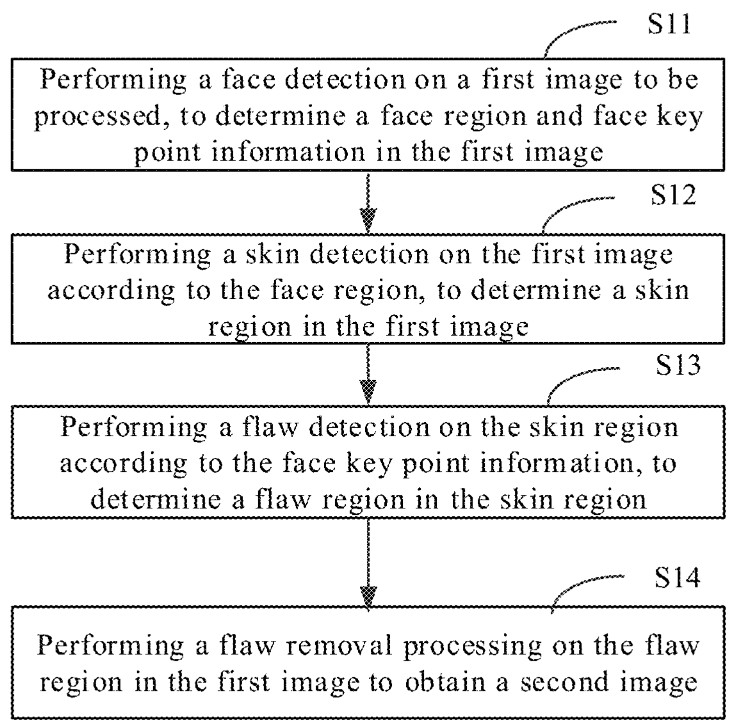
FIG. 1 is a flowchart of an image processing method according to an embodiment of the present disclosure.

In order to enable one of ordinary skill in the art to better understand the technical solutions of the present disclosure, the present disclosure will be described in further detail with reference to the accompanying drawings and implementations.

Unless defined otherwise, technical or scientific terms used herein shall have the ordinary meaning as understood by one of ordinary skill in the art to which the present disclosure belongs. The terms "first", "second", and the like used in the present disclosure are not intended to indicate any order, quantity, or importance, but rather are used for distinguishing one element from another. Further, the term "a", "an", "the", or the like used herein does not denote a limitation of quantity, but rather denotes the presence of at least one element. The term of "comprising", "including", or the like, means that the element or item preceding the term contains the element or item listed after the term and its equivalent, but does not exclude other elements or items. The term "connected", "coupled", or the like is not limited to physical or mechanical connections, but may include electrical connections, whether direct or indirect connections. The terms "upper/on/above", "lower/below/under", "left", "right", and the like are used only for indicating relative positional relationships, and when an absolute position of an object being described is changed, the relative positional relationships may be changed accordingly.

In order to take satisfactory photos, people usually process the photos by using software with a function of retouching the photos. With the increasing popularity of the photo retouching software, people have higher and higher requirements on the beautifying function of the photo retouching software; and people hope that the beautifying effect (especially the common effect of beautifying the skin) is similar to and better than the true self.

The main principle of beautifying the skin is to perform refining and whitening operation and the like on the entire image, to achieve the effect of overall beautifying. However, flaws such as black nevi, comedones, acnes or the like may exist in a face region, and cannot be removed completely in the beautifying operation for the entire image. If a degree of the refining is increased, textures are easily lost, causing an unnatural distortion and a poor treatment effect.

According to the image processing method in the embodiment of the present disclosure, a skin detection is guided according to a face detection, a flaw detection is performed on a skin region according to face key point information, flaws in the skin region are then removed, so that the accuracy of the skin detection and the precision of the flaw detection can be improved, the effect of flaw removal is improved, and the beautifying effect of images is improved.

The image processing method according to the embodiment of the present disclosure may be performed by an electronic device such as a terminal device or a server; the terminal device may be a vehicle-mounted device, a user equipment (UE), a mobile device, a user terminal, a terminal, a cellular phone, a cordless phone, a personal digital assistant (PDA), a handheld device, a computing device, a vehicle-mounted device, a wearable device, or the like; and the method may be implemented by a processor calling a computer readable program instruction stored in a memory. Alternatively, the method may be performed by the server.

FIG. 1 is a flowchart of an image processing method according to an embodiment of the present disclosure. As shown in FIG. 1, the image processing method includes following steps S11 to S14.

Step S11, performing a face detection on a first image to be processed, to determine a face region and face key point information in the first image;

Step S12, performing a skin detection on the first image according to the face region, to determine a skin region in the first image;

Step S13, performing a flaw detection on the skin region according to the face key point information, to determine a flaw region in the skin region;

Step S14, performing a flaw removal processing on the flaw region in the first image to obtain a second image.

For example, the first image to be processed may be an image including a face, such as a selfie, a group photo, or the like acquired by a camera of an electronic device such as a smart phone. Alternatively, the first image may be an image obtained by other means. In the present disclosure, the specific source of the first image is not limited.

In some implementations, a flaw removal function for an image may be provided in the electronic device. For example, a flaw removal control is displayed in an interface for beautifying the image. If the flaw removal control is triggered (for example, a user clicks the flaw removal control), the flaw removal function is enabled to process the first image to be processed.

In some implementations, in step S11, the face detection may be performed on the first image to determine a position of a face frame (i.e., the face region) in the first image; moreover, a face key point extraction may be performed on the face region to obtain the face key point information in the first image, for example, position information of 68 face key points. A detection mode in the related art (for example, using an open-source face feature recognition library) may be adopted to implement the face detection and the face key point extraction. The present disclosure does not limit the specific way of the face detection and the face key point extraction.

In some implementations, in step S12, a target detection value for the skin detection may be determined according to pixel values of pixels in the face region, for example, a mean value and/or a standard deviation of the pixel values of the pixels in the face region may be determined; furthermore, a first limiting condition based on the target detection value may be set, the first image is searched, and pixels satisfying the first limiting condition in the first image are taken as points which are likely to be skin, so that at least one possible skin region (called a candidate skin region) is obtained; further, the candidate skin region including the face is taken as the skin region in the first image.

The skin detection is realized by using a dynamic limiting condition, skins under different skin colors/different illuminations can be accurately detected, and compared with a method of detecting the skin according to an absolute threshold, the embodiment of the present disclosure can obtain a more accurate and reliable detection effect.

In some implementations, after the skin region is obtained, the flaw detection is performed on the skin region in step S13. A plurality of gray-scale thresholds may be preset, and a gray-scale image of the first image is converted into a plurality of binary images, for example, 20 binary images, to obtain a binary image group. The specific values of the gray-scale thresholds and the number of the gray-scale thresholds are not limited in the present disclosure.

In some implementations, a second limiting condition for the flaw detection, such as a size range of the flaw region (e.g., is proportional to a size of an eye), a condition that the flaw region should be outside of a five-sense organ region, or the like, may be determined according to the face key point information. The second limiting condition may further include, for example, a condition that the flaw region is to satisfy a preset roundness threshold or a convexity threshold, or the like, which is not limited in the present disclosure.

In some implementations, connected regions in each binary image may be extracted by detecting a boundary of each binary image, and a region satisfying the second limiting condition is screened out from the connected regions, and is used as a region, that is likely to have a flaw, in the binary image, and is referred to as a candidate flaw region. In this way, the candidate flaw region in each binary image in the binary image group may be obtained.

In some implementations, candidate flaw regions in the binary images may be classified according to positions of center pixels of the candidate flaw regions in all the binary images. For example, distances between the center pixels of the candidate flaw regions in different binary images may be calculated, and if the distances between the center pixels are less than or equal to a preset threshold and the candidate flaw regions exist in all or most of the binary images, the candidate flaw regions may be considered as actual flaw regions.

In some implementations, for any flaw region, a center point position and a region size of the flaw region may be determined according to the center point positions and the region sizes of a corresponding group of candidate flaw regions, for example, the determined center point position and the determined region size of the flaw region are a cluster center of the center point positions and a medium size of the region sizes of the corresponding group of candidate flaw regions, respectively.

By performing the above processing on each flaw region, the flaw region in the skin region of the first image may be obtained.

In some implementations, if no flaw region is detected in step S13, no subsequent processing may be performed, an unprocessed first image is returned, and/or "no flaw region is detected" is prompted. If any flaw region is detected in step S13, i.e., the flaw region exists in the skin region, the flaw removal process may be performed on the flaw region in the first image in step S14.

For example, a plurality of adjacent regions adjacent to the flaw region may be selected, a target region for repairing the flaw region may be selected from the plurality of adjacent regions, and a region image of the flaw region may be replaced by a region image of the target region. In this way, each flaw region is repaired, and a repaired image, which is referred to as the second image, is obtained.

According to the embodiment of the present disclosure, the skin detection is guided according to the face detection, the flaw detection is performed on the skin region according to face key point information, flaws in the skin region are then removed, so that the accuracy of the skin detection and the precision of the flaw detection can be improved, the effect of flaw removal is improved, and the beautifying effect of images is improved.

The image processing method according to the embodiment of the present disclosure will be described below in detail.

As described above, an electronic device may be provided with the flaw removal function for the image, so that a user can select whether to enable the function, and detect and remove flaws in the image after the function is enabled.

In some implementations, before step S11, the method may further include: displaying the flaw removal control for the first image.

In this case, step S11 may include: performing the face detection on the first image, in response to the flaw removal control being triggered, to determine the face region and the face key point information in the first image.

That is, the flaw removal control, for example, as a touchable icon, may be displayed in the interface for beautifying the image; and if the user clicks the flaw removal control, the flaw removal function may be enabled. The specific setting mode and the triggering mode of the flaw removal control are not limited in the present disclosure.

In some implementations, if the user triggers the flaw removal control in the interface, the electronic device starts the flaw removal function in response to the flaw removal control being triggered, performs the face detection in step S11, and performs subsequent processing accordingly.

In this way, the flaw removal function may be enabled based on user triggering, so that the use flexibility for the user is improved, and the use experience of the user is improved.

In some implementations, in step S11, the face detection may be performed on the first image to be processed, to determine the face region in the first image; moreover, the face key point extraction may be performed on the face region to obtain the face key point information in the first image, for example, position coordinates of 68 face key points. A detection mode (for example, using an open-source face feature recognition library) and a face key point extraction mode in the related art may be adopted to implement the face detection and the face key point extraction. The present disclosure does not limit the specific way of the face detection and the face key point extraction.

In some implementations, the skin detection may be performed on the first image in step S12.

The skin detection methods in the related art generally include methods based on a color space, a spectral feature, and a skin color reflection model or the like. Main steps of these detection methods are to transform the color space and then to establish the skin color model for processing. The color space in the skin detection includes RGB, YCrCb, HSV, Lab, or the like. During processing, images are usually converted from the RGB color space into a corresponding color space, and then are processed based on skin color clustering/thresholding (such as, commonly, YCbCr/HSV/RGB/CIELAB color space thresholding) or the like.

The skin color YCrCb color space is a common color model for skin color detection, where Y represents luminance, Cr represents a red component in light, and Cb represents a blue component in light. A color difference in appearance of the skin color is caused by chromaticity, and a distribution for the skin colors of different people is concentrated in a small region. In a skin segmentation algorithm in the related art, generally, a binary segmentation is performed on the Cr component by using an Otsu algorithm, and a clustering result of the skin color may be roughly calculated. However, because a fixed empirical threshold with a large error is used, the detected face region may be not complete, and background pixels having a color close to the skin color may be detected by mistake.

According to the embodiment of the present disclosure, the skin detection is guided according to the face region, so that the accuracy of the skin detection is improved.

Figure 2:
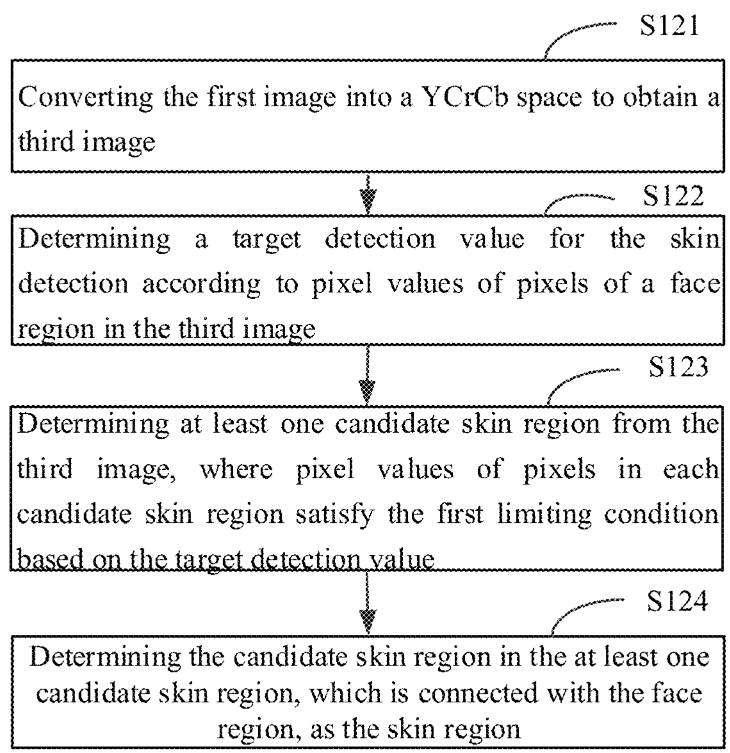
FIG. 2 is a flowchart of a part of steps of an image processing method according to an embodiment of the present disclosure.

FIG. 2 is a flowchart of a part of steps of an image processing method according to an embodiment of the present disclosure. In some implementations, as shown in FIG. 2, step S12 includes following steps S121 to S124.

Step S121, converting the first image into a YCrCb space to obtain a third image.

Step S122, determining a target detection value for the skin detection according to pixel values of pixels of a face region in the third image.

Step S123, determining at least one candidate skin region from the third image, where pixel values of pixels in each candidate skin region satisfy the first limiting condition based on the target detection value.

Step S124, determining the candidate skin region in the at least one candidate skin region, which is connected with the face region, as the skin region.

For example, the first image (e.g., the RGB image) may be color-converted in step S121 to obtain the third image in the YCrCb space. The specific manner of the color conversion is not limited in the present disclosure.

In some implementations, in step S122, the target detection value for the skin detection may be determined according to pixel values of pixels of the face region in the third image. The target detection value may include: a first mean value Mcr and a first standard deviation Vcr of pixel values of the pixels of the face region in a Cr channel in the third image, and a second mean value Mcb and a second standard deviation Vcb of pixel values of the pixels of the face region in a Cb channel in the third image.

The first mean value and the second mean value may represent ranges in which pixel values of the face region (mostly skin) are located, and the first standard deviation and the second standard deviation may represent differences between the pixel values of the face region. The target detection value determined based on the face region may be varied according to different images, and thus is a dynamic value, which can better characterize the skin in each corresponding image, so that the detection precision is improved.

In some implementations, the first limiting condition based on the target detection value may be set; and all pixels in the third image are traversed to determine whether each pixel satisfies the first limiting condition. The first limiting condition may be expressed as:

$$\mathrm{abs}(Crn - Mcr) \le k \times Vcr \,\&\&\, \mathrm{abs}(Cbn - Mcb) \le k \times Vcb. \qquad (1)$$

In the formula (1), abs( ) is an absolute value function, and abs(Cr-Mcr) is an absolute value of (Cr-Mcr); (Crn, Cbn) represents pixel values of the $n^{th}$ pixel in the Cr channel and the Cb channel; Mcr represents the first mean value; Vcr represents the first standard deviation; Mcb represents the second mean value; Vcb represents the second standard deviation; and && represents a logical AND; k is a preset coefficient. According to the 3 sigma principle, a value range of k is [1, 3], for example, k is equal to 2 or 3. The specific value of k may be set by one of ordinary skill in the art according to practical situations, which is not limited in the present disclosure.

In some implementations, for any pixel in the third image, if the pixel values of the pixel in the Cr channel and the Cb channel both satisfy formula (1), the pixel satisfies the first limiting condition, and thus, is taken as a possible skin point (referred to as a candidate skin point). In this way, in step S123, after traversing the pixels in the entire third image, at least one connected region composed of candidate skin points may be obtained as the candidate skin region. The specific manner of determining the connected region is not limited in the present disclosure.

In some implementations, in step S124, the candidate skin region, connected with the face region, in the at least one candidate skin region is determined as the skin region. Thus, a background region having a color close to the skin color can be removed, and the accuracy of the skin detection can be further improved.

It should be understood that according to an embodiment of the present disclosure, the first image may also be transformed into another color space, for example, HSV, Lab, or the like. The corresponding target detection value is determined based on the face region, and the first limiting condition based on the target detection value is set so as to implement the skin detection, which is not limited by the present disclosure.

Figure 3:
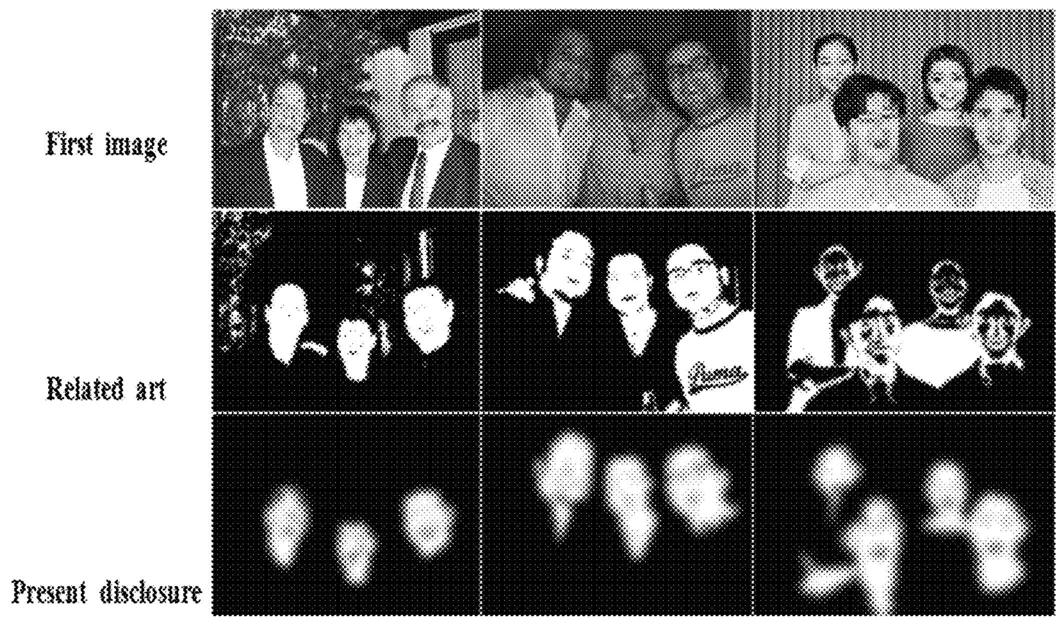
FIG. 3 is example images of skin detections according to the related art and according to an embodiment of the present disclosure.

FIG. 3 is example images of skin detections according to the related art and according to an embodiment of the present disclosure. As shown in FIG. 3, images in a first row are first images to be processed, which are group photos of people with different skin colors/different illuminations, respectively; images in second and third rows are skin detection results in the related art and in the embodiment of the present disclosure, respectively. In the second row, inaccurate detection, false detection, missed detection and the like exist in the skin detection results in the related art; in the third row, the skin detection results according to the embodiment of the present disclosure are accurate, and meet practical requirements.

Therefore, compared with the skin detection according to an absolute threshold, the method in the embodiment of the present disclosure can accurately detect the skin with different skin colors/different illuminations, effectively reduce the distortion of the background region, improve the precision of the skin detection, and obtain a more accurate and reliable detection effect.

Figure 4:
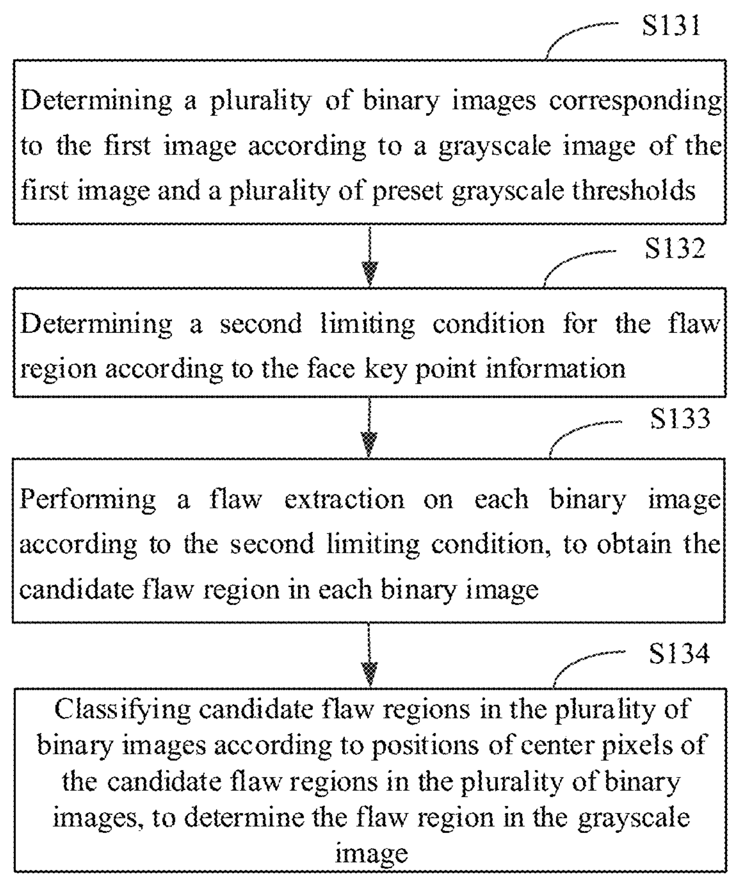
FIG. 4 is a flowchart of a part of steps of an image processing method according to an embodiment of the present disclosure.

After the skin region is obtained, the flaw detection is performed in step S13. FIG. 4 is a flowchart of a part of steps of an image processing method according to an embodiment of the present disclosure. In some implementations, as shown in FIG. 4, step S13 may include following steps S131 to S134.

Step S131, determining a plurality of binary images corresponding to the first image according to a gray-scale image of the first image and a plurality of preset gray-scale thresholds.

Step S132, determining a second limiting condition for the flaw region according to the face key point information.

Step S133, performing a flaw extraction on each binary image according to the second limiting condition, to obtain a candidate flaw region in each binary image.

Step S134, classifying candidate flaw regions in the plurality of binary images according to positions of center pixels of the candidate flaw regions in the plurality of binary images, to determine the flaw region in the gray-scale image, where the flaw region includes a center point position and a region size.

For example, the plurality of gray-scale thresholds may be preset, and in step S131, the gray-scale image of the first image is converted into the plurality of binary images to obtain a binary image group. The specific value of the gray-scale threshold and the number of the gray-scale thresholds are not limited in the present disclosure.

In some implementations, a range of thresholds may be set to [T1, T2] with a step size t, to obtain the gray-scale thresholds T1, T1+t, T1+2t, . . . , T2, where T1 and T2 are values in [0, 255], e.g., are 50 and 200, respectively; t may be a small value, for example, 5, 10, or the like, which is not limited in the present disclosure.

For example, in a case where T1, T2, and t are 50, 200, and 10, respectively, 16 gray-scale thresholds 50, 60, 70, 80, . . . , 190, and 200 may be obtained. The gray-scale image of the first image is converted based on the gray-scale thresholds to obtain 16 binary images to form the binary image group.

In some implementations, in step S132, the second limiting condition for the flaw region may be determined according to the face key point information obtained in step S11, so as to narrow the detection range of the flaw detection and improve the detection accuracy.

The step S132 may include: determining the five-sense organ region in the first image according to the face key point information; and determining the preset size range according to a size of the eye region in the five-sense organ region.

In some implementations, based on the face key point information, the five-sense organ region of the face, including at least one of an eyebrow region, an eye region, a nostril region, a mouth region, or an ear region, may be determined. All or part of the five-sense organ region can be determined, which depends on an angle, shielding and illumination for the face. If the eye region is present in the five-sense organ region, a size of the eye region, such as an area of the eye region, may be further determined.

In some implementations, the second limiting condition may include that a size of the connected region in the image is within the preset size range. If the eye region is determined, the preset size range may be set to be 0.1 time of a size from 5 pixels to the eye region, so that an undersized or oversized connected region may be removed; if the eye region is not determined (for example, the eyes are shielded), a moderate size range may be directly set, for example, 0.1 time of a size from 5 pixels to the eye region, or 5 pixels to 200 pixels. It should be understood that the size range of the connected region may be set by one of ordinary skill in the art according to practical situations, and the present disclosure is not limited thereto.

In some implementations, the second limiting condition may further include that the connected region is inside the skin region and outside the five-sense organ region, so as to remove the connected region outside the skin region and inside the five-sense organ region, and improve the detection accuracy.

In some implementations, the second limiting condition may further include, for example, that a color of the connected region is a preset color, a roundness of the connected region is greater than or equal to a roundness threshold, a convexity of the connected region is greater than or equal to a convexity threshold, an eccentricity ratio of the connected region is less than or equal to an eccentricity ratio threshold, or the like. Therefore, connected regions with obvious unsatisfactory colors and shapes can be removed, and the accuracy of the flaw detection is further improved. It should be understood that the second limiting condition may be set by one of ordinary skill in the art according to practical situations, and the present disclosure is not limited thereto.

In some implementations, the flaw extraction may be performed on each binary image in step S133. The step S133 may include: extracting a connected region in any binary image; determining the connected region satisfying the second limiting condition as the candidate flaw region in the binary image.

That is, for any binary image in the binary image group, different connected regions surrounded by a boundary in the binary image are extracted by detecting the boundary in the binary image. The extraction of the connected region may be realized in a processing manner in the related art, and the present disclosure is not limited thereto.

In some implementations, the region satisfying the second limiting condition may be screened out from the connected regions, as a possible flaw region in the binary image, called the candidate flaw region.

In some implementations, the second limiting condition includes at least one of: a color of the connected region being a preset color, a size of the connected region being within the preset size range, a roundness of the connected region being greater than or equal to a roundness threshold, a convexity of the connected region being greater than or equal to a convexity threshold, an eccentricity ratio of the connected region being less than or equal to an eccentricity ratio threshold, or the connected region being positioned in the skin region and outside the five-sense organ region.

The five-sense organ region includes at least one of an eyebrow region, an eye region, a nostril region, a mouth region or an ear region, and the preset color includes black or white.

In some implementations, the preset color may be set to black, for example; the size range is set to be 0.1 time of a size from 5 pixels to the eye region; the roundness threshold is set to 0.5; the convexity threshold is set to 0.9; the eccentricity ratio threshold is set to 0.3. It should be understood that one of ordinary skill in the art may set specific contents of the second limiting condition and values of various thresholds and ranges therein according to practical situations, which is not limited in the present disclosure.

In some implementations, any type of flaws, such as black nevi, comedones, acnes or the like, which may exist in the face region, may be detected. The second limiting condition may be set according to the type of the flaws to be actually detected. For example, the preset color may be set to be white during detecting comedones, which is not limited by the present disclosure.

In this way, the binary images in the binary image group are processed respectively, to obtain candidate flaw regions in the binary images.

By defining limiting conditions, approximately circular flaws with the preset color and the moderate size in the face region can be screened out and the five-sense organ region can be protected, thereby excluding the connected regions obviously not belonging to the flaws, reducing the noise, improving the precision of detecting the flaws.

In some implementations, in step S134, the candidate flaw regions in the plurality of binary images may be classified according to the positions of the center pixels of the candidate flaw regions in the plurality of binary images, to determine the flaw region in the gray-scale image. The step S134 may include: determining at least one region group according to the positions of the center pixels of the candidate flaw regions in the plurality of binary images, where the candidate flaw regions in each region group belong to different binary images, distances between the center pixels of the candidate flaw regions in the region group are less than or equal to a distance threshold, and the number of the candidate flaw regions in the region group is greater than or equal to a number threshold; determining the center point position of the flaw region corresponding to the region group according to the positions of the center pixels of the candidate flaw regions in the region group; and determining the region size of the flaw region corresponding to the region group according to sizes of the candidate flaw regions in the region group.

For example, the distances between the center pixels of the candidate flaw regions of different binary images may be calculated respectively; if the distances between the center pixels are less than or equal to a preset distance threshold Tb, the corresponding candidate flaw regions may be considered as the same region; if all or most of the binary images include the corresponding candidate flaw regions, the candidate flaw regions as a group may be considered as actual flaw regions, and thus, a region group is obtained.

In this way, after processing the candidate flaw regions of all the binary images, at least one region group may be obtained, each region group corresponds to one flaw region. The candidate flaw regions in the same region group belong to different binary images, the distances between the center pixels of the candidate flaw regions in the region group are less than or equal to the distance threshold, and the number of the candidate flaw regions in the region group is greater than or equal to the number threshold. The present disclosure does not limit the specific values of the distance threshold and the number threshold.

In some implementations, for any one region group, the center point position of the flaw region corresponding to the region group may be determined according to the positions of the center pixels of the candidate flaw regions in the region group. The step of determining the center point position of the flaw region corresponding to the region group may include: determining weights of the candidate flaw regions according to inertia rates of the candidate flaw regions in the region group; and determining a weighted sum of the positions of the center pixels of the candidate flaw regions as the center point position of the flaw region corresponding to the region group according to the weights of the candidate flaw regions.

That is, the inertia rate of each candidate flaw region in the region group may be determined, and a square of the inertia rate of each candidate flaw region may be normalized to obtain the weight q of each candidate flaw region. The meaning of the weight q is that: the closer a shape of each candidate flaw region in the binary image is to a circle, the more likely it is a flaw, and therefore the greater the contribution to the location of the flaw region in the gray-scale image is.

In some implementations, the weighted sum of the positions (pixel coordinates) of the center pixels of the candidate flaw regions may be determined as the center point position of the flaw region corresponding to the region group according to the weights of the candidate flaw regions. In this way, the accuracy of the location of the flaw region can be improved.

In some implementations, for any one region group, sizes (e.g., areas or radii) of the candidate flaw regions in the region group may be ranked, and a size in the middle of the ranked sizes is determined as the region size of the flaw region corresponding to the region group; or a mean value of the sizes of the candidate flaw regions in the region group may be obtained, and may be determined as the region size of the flaw region corresponding to the region group, which is not limited in the present disclosure.

In this way, after all region groups are processed respectively, the flaw region in the gray-scale image, that is, the flaw region in the first image, may be obtained, thereby completing the process of the flaw detection.

In this way, the flaw region can be determined accurately, and the flaw detection precision is improved.

In some implementations, if no flaw region is detected in step S13, for example, no candidate flaw region is extracted in step S133, or no flaw region satisfying the condition is obtained after classification in step S134, the subsequent processing may not be performed, the unprocessed first image is returned, and/or "no flaw region is detected" is prompted.

In some implementations, if any flaw region is detected in step S13, i.e., the flaw region exists in the skin region, the flaw removal may be performed in step S14.

Figure 5:
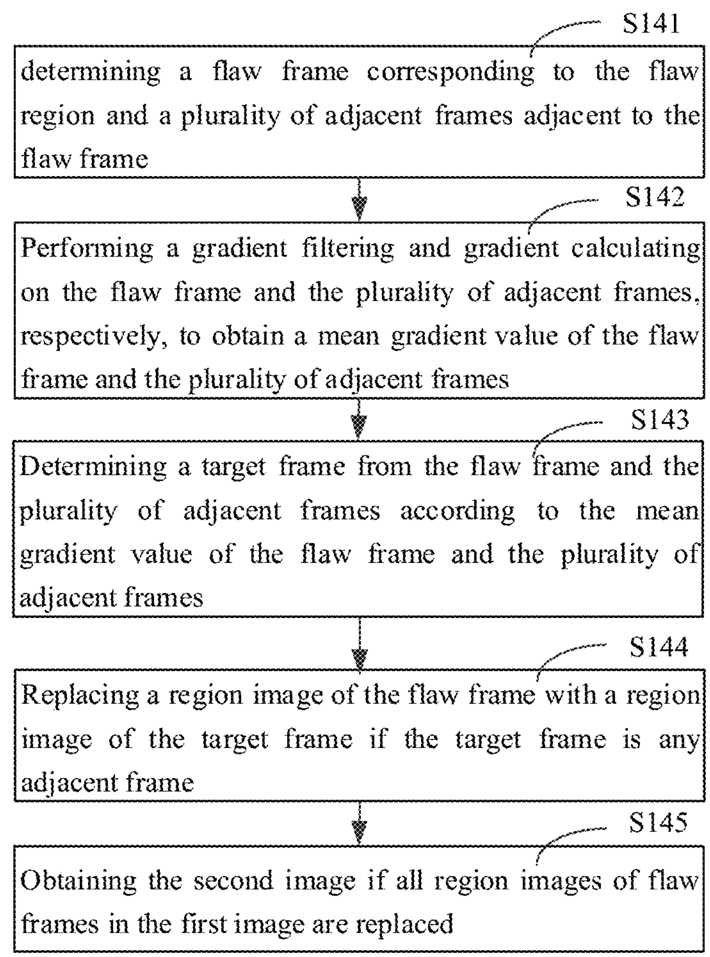
FIG. 5 is a flowchart of a part of steps of an image processing method according to an embodiment of the present disclosure.

FIG. 5 is a flowchart of a part of steps of an image processing method according to an embodiment of the present disclosure. In some implementations, as shown in FIG. 5, step S14 may include following steps S141 to S145.

Step S141, for any flaw region, determining a flaw frame corresponding to the flaw region and a plurality of adjacent frames adjacent to the flaw frame, where a size of each of the adjacent frames is the same as that of the flaw frame, and the adjacent frames are in the skin region.

Step S142, performing gradient filtering and gradient calculating on the flaw frame and the plurality of adjacent frames, respectively, to obtain a mean gradient value of the flaw frame and the plurality of adjacent frames.

Step S143, determining a target frame from the flaw frame and the plurality of adjacent frames according to the mean gradient value of the flaw frame and the plurality of adjacent frames.

Step S144, replacing a region image of the flaw frame with a region image of the target frame if the target frame is any adjacent frame.

Step S145, obtaining the second image if all region images of the flaw frame in the first image are replaced.

For example, the flaw removal process may be performed on each flaw region in the first image. For any flaw region, the flaw frame corresponding to the flaw region may be determined in step S141. The flaw region obtained in step S13 may have a circular shape or an irregular shape, and a circumscribed rectangle of the flaw region may be used as the flaw frame corresponding to the flaw region, so as to simplify the difficulty of subsequent processing.

In some implementations, the plurality of adjacent frames adjacent to the flaw frame may be determined, that is, four rectangular frames, which are respectively on the upper, lower, left, and right sides of the flaw frame and are adjacent to the flaw frame, are selected around the flaw frame. The size of each adjacent frame is the same as that of the corresponding flaw frame, and each adjacent frame is in the skin region. The position, the skin color, the illumination and the like of each adjacent frame are close to those of the flaw frame. The adjacent frames are adopted for removing the flaws, so that the smoothness of the processed image can be improved, and the processing effect is improved.

Figure 6:
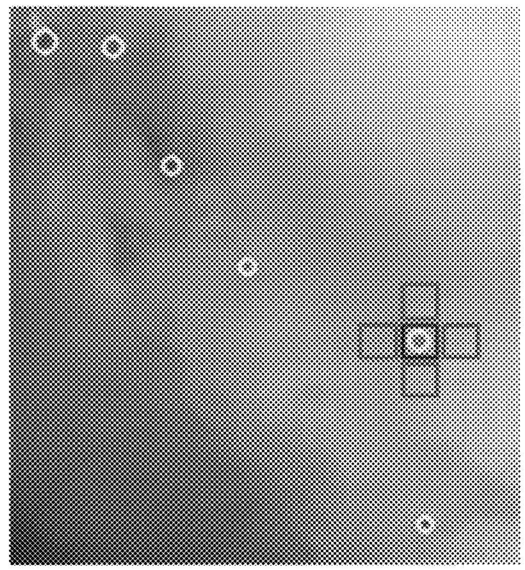
FIG. 6 is an example image of a flaw frame and adjacent frames according to an embodiment of the present disclosure.

FIG. 6 is an example image of a flaw frame and adjacent frames adjacent to the flaw frame according to an embodiment of the present disclosure. As shown in FIG. 6, the skin region includes a plurality of flaw regions, i.e., the circular or approximately circular blocks in FIG. 6. For a certain flaw region 61, the circumscribed rectangle thereof is used as a flaw frame; four rectangular regions adjacent to the flaw frame are selected as the adjacent frames (also called neighborhoods).

In some implementations, the gradient filtering and gradient calculating may be performed on the flaw frame and the plurality of adjacent frames in step S142, respectively. The step S142 may include: for any one region frame of the flaw frame and the plurality of adjacent frames, performing gradient transverse filtering and gradient longitudinal filtering on a region image of the region frame, to obtain a transverse filtering map and a longitudinal filtering map of the region frame; determining a gradient map of the region frame according to the transverse filtering map and the longitudinal filtering map; and determining a mean value of points in the gradient map as the mean gradient value of the region frame.

That is to say, for any one region frame in the flaw frame and the plurality of adjacent frames, Sobel gradient transversal filtering and gradient longitudinal filtering may be performed on pixel values (for example, gray-scale values) of pixels in the region frame, respectively, to obtain the transversal filtering map and the longitudinal filtering map of the region frame.

Sobel operators of a transversal filter and a longitudinal filter used for the gradient transversal filtering and the gradient longitudinal filtering may be expressed as follows.

An X transversal filter is represented by:

$$\begin{bmatrix} -1 & 0 & +1 \\ -2 & 0 & +2 \\ -1 & 0 & +1 \end{bmatrix}.$$

A Y longitudinal filter is represented by:

$$\begin{bmatrix} +1 & +2 & +1 \\ 0 & 0 & 0 \\ -1 & -2 & -1 \end{bmatrix}.$$

It should be understood that the gradient transversal filtering and the gradient longitudinal filtering may be implemented by any other type of filters by one of ordinary skill in the art, and the present disclosure is not limited thereto.

In some implementations, a gradient value of each point in the transversal filtering map and the longitudinal filtering map may be calculated to obtain a gradient map. If gradient values of any pixel in the region frame in the transverse filtering map and in the longitudinal filtering map are Gx and Gy, the gradient value G of the pixel may be expressed as:

$$G = \sqrt[2]{G_x^2 + G_y^2}. \tag{2}$$

In this way, all the pixels in the region frame are processed respectively, and the gradient map of the region frame may be obtained.

In some implementations, the gradient values G of points in the gradient map may be averaged to obtain the mean gradient value mean (G) of the region frame.

In this way, mean gradient values of the flaw frame and the plurality of adjacent frames may be obtained by processing the flaw frame and the plurality of adjacent frames, respectively. The mean gradient value is used for representing the speed of a change in a density in the multi-dimensional direction of the image, which can characterize a relative definition of the image. The less the mean gradient value is, the clearer the image is and the better the image quality is.

In some implementations, in step S143, the frame with the smallest mean gradient value may be used as the target frame with the best image quality according to the mean gradient values of the flaw frame and the plurality of adjacent frames.

In some implementations, in step S144, if the target frame is any adjacent frame, the region image of the flaw frame is replaced with a region image of the first image in the target frame, and the flaw removal process for the flaw frame is implemented.

In some implementations, if the target frame is the flaw frame, it indicates that the quality of the adjacent frame is inferior to that of the flaw frame, and the flaws cannot be removed with the adjacent frame. In this case, a selection may be performed in a greater range. For example, the image frames adjacent to the adjacent frames may be selected, the gradient filtering and gradient calculating are performed on each of the image frames to obtain a mean gradient value. A region image of the image frame with the minimum mean gradient value is selected to replace the region image of the flaw frame, thereby realizing the flaw removal processing for the flaw frame. The present disclosure does not limit the specific selection positions of the image frames to be selected.

In some implementations, each flaw frame in the first image may be processed through steps S141 to S144. In step S145, if all region images of flaw frames in the first image are replaced, a second image is obtained, and the flaw removal process is completed.

The flaw removal in the image is realized through the neighborhood compensation processing mode, so that the smoothness degree of the processed image can be improved, and a good flaw removal effect is achieved.

According to the image processing method in the embodiment of the present disclosure, the correct and reasonable skin detection is guided according to the face detection; the flaw detection is performed on the skin region, so that the detection precision is improved and the time consumption is reduced; and the flaws are removed by using the neighborhood compensation mode, so that the flaws in the portrait are accurately removed, and the skin is beautified.

According to the image processing method in the embodiment of the present disclosure, the skin detection is performed on different faces by using a dynamic threshold, skins under different skin colors/different illuminations can be accurately detected, so that compared with the detection method according to an absolute threshold, the method in the present disclosure can obtain a more reliable detection effect.

According to the image processing method in the embodiment of the present disclosure, a detector for detecting the flaws can be initialized adaptively according to the face key point information. For example, a parameter of the detector, that is, the second limiting condition, is limited according to the size of the eye region, so that the detection range of the flaw detection is narrowed, and the detection accuracy is improved.

According to the image processing method in the embodiment of the present disclosure, the detected flaws are removed in the neighborhood compensation mode, so that the effect of removing the flaws from the face is obvious, the quality of the skin in the portrait is obviously improved, and the beautifying effect of retaining textures of the skin and removing the flaws can be achieved. According to the embodiment of the present disclosure, the beautifying effect on the face can be obviously improved in combination with slight refining.

Figure 7:
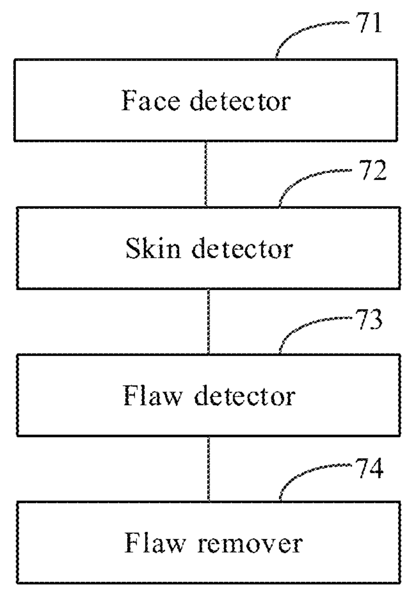
FIG. 7 is a block diagram of an image processing apparatus according to an embodiment of the present disclosure.

According to an embodiment of the present disclosure, there is further provided an image processing apparatus. FIG. 7 is a block diagram of an image processing apparatus according to an embodiment of the present disclosure. As shown in FIG. 7, the apparatus includes a face detector 71, a skin detector 72, a flaw detector 73 and a flaw remover 74.

The face detector 71 is configured to perform a face detection on a first image to be processed, to determine a face region and face key point information in the first image.

The skin detector 72 is configured to perform a skin detection on the first image according to the face region, to determine a skin region in the first image.

The flaw detector 73 is configured to perform a flaw detection on the skin region according to the face key point information, to determine a flaw region in the skin region.

The flaw remover 74 is configured to perform a flaw removal processing on the flaw region in the first image to obtain a second image.

In some implementations, the skin detector 72 is configured to: convert the first image into a YCrCb space to obtain a third image; determine a target detection value for the skin detection according to pixel values of pixels of a face region in the third image; determine at least one candidate skin region from the third image, where pixel values of pixels in each candidate skin region satisfy the first limiting condition based on the target detection value; and determine the candidate skin region in the at least one candidate skin region, which is connected with the face region, as the skin region.

In some implementations, the target detection value includes: a first mean value and a first standard deviation of pixel values of the pixels of the face region in a Cr channel in the third image, and a second mean value and a second standard deviation of pixel values of the pixels of the face region in a Cb channel in the third image.

In some implementations, the flaw detector 73 is configured to: determine a plurality of binary images corresponding to the first image according to a gray-scale image of the first image and a plurality of preset gray-scale thresholds; determine a second limiting condition for the flaw region according to the face key point information; perform a flaw extraction on each binary image according to the second limiting condition, to obtain a candidate flaw region in each binary image; and classify candidate flaw regions in the plurality of binary images according to positions of center pixels of the candidate flaw regions in the plurality of binary images, to determine the flaw region in the gray-scale image, where the flaw region includes a center point position and a region size.

In some implementations, the performing a flaw extraction on each binary image according to the second limiting condition, to obtain a candidate flaw region in each binary image, includes: extracting a connected region in any binary image; determining a connected region satisfying the second limiting condition as the candidate flaw region in the binary image, where the second limiting condition includes at least one of: a color of the connected region being a preset color, a size of the connected region being within a preset size range, a roundness of the connected region being greater than or equal to a roundness threshold, a convexity of the connected region being greater than or equal to a convexity threshold, an eccentricity ratio of the connected region being less than or equal to an eccentricity ratio threshold, or the connected region being positioned in the skin region and outside the five-sense organ region. The five-sense organ region includes at least one of an eyebrow region, an eye region, a nostril region, a mouth region or an ear region, and the preset color includes black or white.

In some implementations, the determining a second limiting condition for the flaw region according to the face key point information, includes: determining the five-sense organ region in the first image according to the face key point information; and determining the preset size range according to a size of the eye region in the five-sense organ region.

In some implementations, classifying the candidate flaw regions in the plurality of binary images according to the positions of the center pixels of the candidate flaw regions in the plurality of binary images, to determine the flaw region in the gray-scale image, includes: determining at least one region group according to the positions of the center pixels of the candidate flaw regions in the plurality of binary images, where the candidate flaw regions in each region group belong to different binary images, distances between the center pixels of the candidate flaw regions in the region group are less than or equal to a distance threshold, and the number of the candidate flaw regions in the region group is greater than or equal to a number threshold; determining the center point position of the flaw region corresponding to the region group according to the positions of the center pixels of the candidate flaw regions in the region group; determining the region size of the flaw region corresponding to the region group according to sizes of the candidate flaw regions in region group.

In some implementations, determining the center point position of the flaw region corresponding to the region group according to the positions of the center pixels of the candidate flaw regions in the region group, includes: determining weights of the candidate flaw regions according to inertia rates of the candidate flaw regions in the region group; determining a weighted sum of the positions of the center pixels of the candidate flaw regions as the center point position of the flaw region corresponding to the region group according to the weights of the candidate flaw regions.

In some implementations, the flaw remover 74 is configured to: for any flaw region, determine a flaw frame corresponding to the flaw region and a plurality of adjacent frames adjacent to the flaw frame, where a size of each of the adjacent frames is the same as that of the flaw frame, and the adjacent frames are in the skin region; perform a gradient filtering and gradient calculating on the flaw frame and the plurality of adjacent frames, respectively, to obtain a mean gradient value of the flaw frame and the plurality of adjacent frames; determine a target frame from the flaw frame and the plurality of adjacent frames according to the mean gradient value of the flaw frame and the plurality of adjacent frames; replace a region image of the flaw frame with a region image of the target frame if the target frame is any adjacent frame; and obtain the second image if all region images of flaw frames in the first image are replaced.

In some implementations, performing the gradient filtering and gradient calculating on the flaw frame and the plurality of adjacent frames, respectively, to obtain the mean gradient value of the flaw frame and the plurality of adjacent frames, includes: for any one region frame of the flaw frame and the plurality of adjacent frames, performing gradient transverse filtering and gradient longitudinal filtering on a region image of the region frame, to obtain a transverse filtering map and a longitudinal filtering map of the region frame; determining a gradient map of the region frame according to the transverse filtering map and the longitudinal filtering map; and determining a mean value of points in the gradient map as the mean gradient value of the region frame.

In some implementations, the image processing apparatus further includes: a control display configured to display a flaw removal control for the first image; where the face detector is configured to: perform the face detection on the first image, in response to the flaw removal control being triggered, to determine the face region and the face key point information in the first image.

Figure 8:
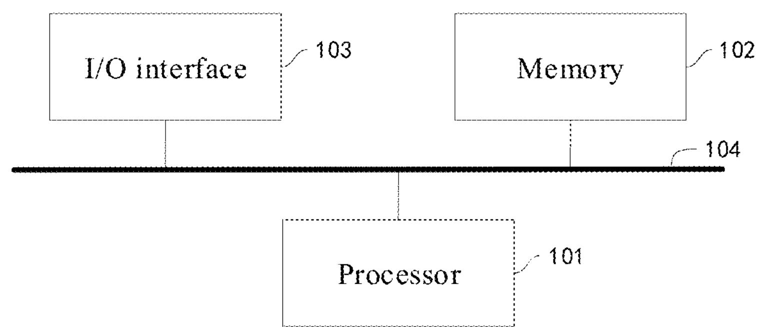
FIG. 8 is a schematic diagram of a structure of an electronic device according to an embodiment of the present disclosure.

FIG. 8 is a schematic diagram of a structure of an electronic device according to an embodiment of the present disclosure. As shown in FIG. 8, an embodiment of the present disclosure provides an electronic device, including: at least one processor 101, a memory 102, and at least one I/O interface 103. The memory 102 stores at least one program that, when executed by the at least one processor, causes the at least one processor to implement the image processing method described above; the at least one I/O interface 103 is connected between the at least one processor and the memory, and is configured to enable information interaction between the at least one processor and the memory.

The processor 101 is a device with data processing capability, which includes, but is not limited to, a central processing unit (CPU), or the like; the memory 102 is a device with data storage capability, which includes, but is not limited to, random access memory (RAM, more specifically SDRAM, DDR, etc.), read only memory (ROM), electrically erasable programmable read only memory (EEPROM), flash memory (FLASH); the I/O interface (read/write interface) 103 is connected between the processor 101 and the memory 102, and is configured to enable information interaction between the processor 101 and the memory 102.

In some implementations, the at least one processor 101, the memory 102, and the at least one I/O interface 103 are connected to each other via a bus 104, which in turn are connected to other components of a computing device.

According to an embodiment of the present disclosure, a non-transitory computer readable storage medium is further provided. The non-transitory computer readable storage medium stores a computer program thereon, the program, when executed by a processor, causes the processor to implement steps in the image processing method described above.

In particular, the processes described above with reference to the flow diagrams may be implemented as computer software programs, according to the embodiments of the present disclosure. For example, an embodiment of the present disclosure includes a computer program product including a computer program embodied on a machine readable storage medium, the computer program includes a program code for performing the method as shown in the flow diagrams. In such embodiment, the computer program may be downloaded from a network via a communication portion and then installed, and/or installed from a removable medium. The above functions defined in the system of the present disclosure are performed when the computer program is executed by a central processing unit (CPU).

It should be noted that the computer readable storage medium shown in the present disclosure may be a computer readable signal medium or a computer readable storage medium or any combination thereof. The computer readable storage medium may be, for example, but not limited to, an electronic, magnetic, optical, electromagnetic, infrared, or semiconductor system, apparatus, or device, or any combination thereof. More specific examples of the computer readable storage medium may include, but not limited to, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination thereof. In the present disclosure, the computer readable storage medium may be any tangible medium that may contain or store a program for use by or in connection with an instruction execution system, an apparatus, or a device. In the present disclosure, the computer readable signal medium may include a propagated data signal with computer readable program code embodied therein, for example, in baseband or as part of a carrier wave. Such propagated data signal may take any of a variety of forms, including, but not limited to, an electro-magnetic signal, an optical signal, or any suitable combination thereof. The computer readable signal medium may be any computer readable storage medium except the computer readable storage medium. The computer readable storage medium may communicate, propagate, or transport a program for use by or in connection with the instruction execution system, the apparatus, or the device. The program code embodied on the computer readable storage medium may be transmitted using any appropriate medium, including, but not limited to, wireless, wire, fiber optic cable, RF, etc., or any suitable combination thereof.

The flowchart and block diagrams in the drawings illustrate the architecture, functionality, and operation of implementations of systems, methods and computer program products according to various embodiments of the present disclosure. In this regard, each block in the flowchart or block diagrams may represent a module, a program segment, or a portion of a code, which include one or more executable instructions for implementing specified logical function(s). It should also be noted that, in some implementations, the functions noted in the blocks may occur out of the order noted in the drawings. For example, two blocks shown in succession may, in fact, be executed substantially concurrently, or the blocks may sometimes be executed in the reverse order, depending upon the functionality involved. It will also be noted that each block of the block diagrams and/or flowcharts, and a combination of blocks in the block diagrams and/or flowcharts may be implemented by special purpose hardware-based systems that perform the specified functions or operations, or a combination of special purpose hardware and computer instructions.

Circuits or sub-circuits described in the embodiments of the present disclosure may be implemented by software or hardware. The described circuits or sub-circuits may also be provided in a processor, which may be described as a processor, including a receiving circuit and a processing circuit, the processing circuit includes a write sub-circuit and a read sub-circuit. Names of such circuits or sub-circuits do not constitute a limitation to the circuits or sub-circuits themselves in some cases. For example, the receiving circuit may also be described as "for receiving a video signal".

It should be understood that the above embodiments are merely exemplary embodiments adopted to explain the principles of the present disclosure, and the present disclosure is not limited thereto. It will be apparent to one of ordinary skill in the art that various changes and modifications may be made without departing from the spirit and scope of the present disclosure, and such changes and modifications fall within the scope of the present disclosure.

What is claimed is:

1. An image processing method, comprising: performing a face detection on a first image to be processed, to determine a face region and face key point information in the first image;

performing a skin detection on the first image according to the face region, to determine a skin region in the first image based on a first limiting condition;

performing a flaw detection on the skin region according to the face key point information, to determine a flaw region in the skin region;

and performing a flaw removal processing on the flaw region in the first image to obtain a second image, wherein performing the flaw detection on the skin region according to the face key point information, to determine the flaw region in the skin region, comprises: determining a plurality of binary images corresponding to the first image according to a gray-scale image of the first image and a plurality of preset gray-scale thresholds;

determining a second limiting condition for the flaw region according to the face key point information;

performing a flaw extraction on each binary image according to the second limiting condition, to obtain a candidate flaw region in each binary image; and classifying candidate flaw regions in the plurality of binary images according to positions of center pixels of the candidate flaw regions in the plurality of binary images, to determine the flaw region in the gray-scale image, wherein the flaw region comprises a center point position and a region size.

2. The method of claim 1, wherein performing the skin detection on the first image according to the face region, to determine the skin region in the first image, comprises:

converting the first image into a YCrCb space to obtain a third image;

determining a target detection value for the skin detection according to pixel values of pixels of the face region in the third image;

determining at least one candidate skin region from the third image, where pixel values of pixels in each candidate skin region satisfy the first limiting condition based on the target detection value; and determining the candidate skin region connected with the face region as the skin region.

3. The method of claim 2, wherein the target detection value comprises: a first mean value and a first standard deviation of pixel values of the pixels of the face region in a Cr channel in the third image, and a second mean value and a second standard deviation of pixel values of the pixels of the face region in a Cb channel in the third image.

4. The method of claim 1, wherein performing the flaw extraction on each binary image according to the second limiting condition, to obtain the candidate flaw region in each binary image, comprises:

extracting a connected region in any binary image; and determining a connected region satisfying the second limiting condition as the candidate flaw region in the binary image;

wherein the second limiting condition comprises at least one of: a color of the connected region being a preset color, a size of the connected region being within a preset size range, a roundness of the connected region being greater than or equal to a roundness threshold, a convexity of the connected region being greater than or equal to a convexity threshold, an eccentricity ratio of the connected region being less than or equal to an eccentricity ratio threshold, or the connected region being positioned in the skin region and outside a five-sense organ region; and wherein the five-sense organ region comprises at least one of an eyebrow region, an eye region, a nostril region, a mouth region or an ear region, and the preset color comprises black or white.

5. The method of claim 4, wherein determining the second limiting condition for the flaw region according to the face key point information, comprises:

determining the five-sense organ region in the first image according to the face key point information; and determining the preset size interval according to a size of the eye region in the five-sense organ region.

6. The method of claim 1, wherein classifying the candidate flaw regions in the plurality of binary images according to the positions of the center pixels of the candidate flaw regions in the plurality of binary images, to determine the flaw region in the gray-scale image, comprises:

determining at least one region group according to the positions of the center pixels of the candidate flaw regions in the plurality of binary images, wherein the candidate flaw regions in each region group belong to different binary images, distances between the center pixels of the candidate flaw regions in the region group are less than or equal to a distance threshold, and a number of the candidate flaw regions in the region group is greater than or equal to a number threshold;

determining a center point position of the flaw region corresponding to the region group according to the positions of the center pixels of the candidate flaw regions in the region group; and determining the region size of the flaw region corresponding to the region group according to sizes of the candidate flaw regions in the region group.

7. The method of claim 6, wherein determining the center point position of the flaw region corresponding to the region group according to the positions of the center pixels of the candidate flaw regions in the region group, comprises:

determining weights of the candidate flaw regions according to inertia rates of the candidate flaw regions in the region group; and determining a weighted sum of the positions of the center pixels of the candidate flaw regions as the center point position of the flaw region corresponding to the region group according to the weights of the candidate flaw regions.

8. The method of claim 1, wherein performing the flaw removal processing on the flaw region in the first image to obtain the second image, comprises:

determining a flaw frame corresponding to the flaw region and a plurality of adjacent frames adjacent to the flaw frame, wherein a size of each of the adjacent frames is the same as that of the flaw frame, and the adjacent frames are in the skin region;

performing a gradient filtering and gradient calculating on the flaw frame and the plurality of adjacent frames, respectively, to obtain a mean gradient value of the flaw frame and the plurality of adjacent frames;

determining a target frame from the flaw frame and the plurality of adjacent frames according to the mean gradient value of the flaw frame and the plurality of adjacent frames;

replacing a region image of the flaw frame with a region image of the target frame if the target frame is any adjacent frame; and obtaining the second image if all region images of flaw frames in the first image are replaced.

9. The method of claim 8, wherein performing the gradient filtering and gradient calculating on the flaw frame and the plurality of adjacent frames, respectively, to obtain the mean gradient value of the flaw frame and the plurality of adjacent frames, comprises:

for any one region frame of the flaw frame and the plurality of adjacent frames, performing gradient transverse filtering and gradient longitudinal filtering on a region image of the region frame, to obtain a transverse filtering map and a longitudinal filtering map of the region frame;

determining a gradient map of the region frame according to the transverse filtering map and the longitudinal filtering map; and determining a mean value of points in the gradient map as the mean gradient value of the region frame.

10. The method of claim 1, wherein before performing the face detection on the first image to be processed, to determine the face region and face key point information in the first image, the method further comprises:

displaying a flaw removal control for the first image;

wherein performing the face detection on the first image to be processed, to determine the face region and face key point information in the first image, comprises:

performing the face detection on the first image, in response to the flaw removal control being triggered, to determine the face region and the face key point information in the first image.

11. An electronic device, comprising:

at least one processor; and a memory for storing at least one program;

the at least one program, when executed by the at least one processor, causes the at least one processor to implement the image processing method of claim 1.

12. A non-transitory computer readable storage medium, storing a computer program thereon, the computer program, when executed by a processor, causes the processor to implement steps in the image processing method of claim 1.

13. The method of claim 2, wherein performing the flaw removal processing on the flaw region in the first image to obtain the second image, comprises:

determining a flaw frame corresponding to the flaw region and a plurality of adjacent frames adjacent to the flaw frame, wherein a size of each of the adjacent frames is the same as that of the flaw frame, and the adjacent frames are in the skin region;

performing a gradient filtering and gradient calculating on the flaw frame and the plurality of adjacent frames, respectively, to obtain a mean gradient value of the flaw frame and the plurality of adjacent frames;

determining a target frame from the flaw frame and the plurality of adjacent frames according to the mean gradient value of the flaw frame and the plurality of adjacent frames;

replacing a region image of the flaw frame with a region image of the target frame if the target frame is any adjacent frame; and obtaining the second image if all region images of flaw frames in the first image are replaced.

14. The method of claim 3, wherein performing the flaw removal processing on the flaw region in the first image to obtain the second image, comprises:

determining a flaw frame corresponding to the flaw region and a plurality of adjacent frames adjacent to the flaw frame, wherein a size of each of the adjacent frames is the same as that of the flaw frame, and the adjacent frames are in the skin region;

performing a gradient filtering and gradient calculating on the flaw frame and the plurality of adjacent frames, respectively, to obtain a mean gradient value of the flaw frame and the plurality of adjacent frames;

determining a target frame from the flaw frame and the plurality of adjacent frames according to the mean gradient value of the flaw frame and the plurality of adjacent frames;

replacing a region image of the flaw frame with a region image of the target frame if the target frame is any adjacent frame; and obtaining the second image if all region images of flaw frames in the first image are replaced.

15. The method of claim 4, wherein performing the flaw removal processing on the flaw region in the first image to obtain the second image, comprises:

determining a flaw frame corresponding to the flaw region and a plurality of adjacent frames adjacent to the flaw frame, wherein a size of each of the adjacent frames is the same as that of the flaw frame, and the adjacent frames are in the skin region;

performing a gradient filtering and gradient calculating on the flaw frame and the plurality of adjacent frames, respectively, to obtain a mean gradient value of the flaw frame and the plurality of adjacent frames;

determining a target frame from the flaw frame and the plurality of adjacent frames according to the mean gradient value of the flaw frame and the plurality of adjacent frames;

replacing a region image of the flaw frame with a region image of the target frame if the target frame is any adjacent frame; and obtaining the second image if all region images of flaw frames in the first image are replaced.

16. The method of claim 5, wherein performing the flaw removal processing on the flaw region in the first image to obtain the second image, comprises:

determining a flaw frame corresponding to the flaw region and a plurality of adjacent frames adjacent to the flaw frame, wherein a size of each of the adjacent frames is the same as that of the flaw frame, and the adjacent frames are in the skin region;

performing a gradient filtering and gradient calculating on the flaw frame and the plurality of adjacent frames, respectively, to obtain a mean gradient value of the flaw frame and the plurality of adjacent frames;

determining a target frame from the flaw frame and the plurality of adjacent frames according to the mean gradient value of the flaw frame and the plurality of adjacent frames;

replacing a region image of the flaw frame with a region image of the target frame if the target frame is any adjacent frame; and obtaining the second image if all region images of flaw frames in the first image are replaced.

17. The method of claim 6, wherein performing the flaw removal processing on the flaw region in the first image to obtain the second image, comprises:

determining a flaw frame corresponding to the flaw region and a plurality of adjacent frames adjacent to the flaw frame, wherein a size of each of the adjacent frames is the same as that of the flaw frame, and the adjacent frames are in the skin region;

performing a gradient filtering and gradient calculating on the flaw frame and the plurality of adjacent frames, respectively, to obtain a mean gradient value of the flaw frame and the plurality of adjacent frames;

determining a target frame from the flaw frame and the plurality of adjacent frames according to the mean gradient value of the flaw frame and the plurality of adjacent frames;

replacing a region image of the flaw frame with a region image of the target frame if the target frame is any adjacent frame; and obtaining the second image if all region images of flaw frames in the first image are replaced.

18. An image processing method, comprising:

performing a face detection on a first image to be processed, to determine a face region and face key point information in the first image;

performing a skin detection on the first image according to the face region, to determine a skin region in the first image;

performing a flaw detection on the skin region according to the face key point information, to determine a flaw region in the skin region; and performing a flaw removal processing on the flaw region in the first image to obtain a second image, wherein performing the flaw removal processing on the flaw region in the first image to obtain the second image, comprises:

determining a flaw frame corresponding to the flaw region and a plurality of adjacent frames adjacent to the flaw frame, wherein a size of each of the adjacent frames is the same as that of the flaw frame, and the adjacent frames are in the skin region;

performing a gradient filtering and gradient calculating on the flaw frame and the plurality of adjacent frames, respectively, to obtain a mean gradient value of the flaw frame and the plurality of adjacent frames;

determining a target frame from the flaw frame and the plurality of adjacent frames according to the mean gradient value of the flaw frame and the plurality of adjacent frames;

replacing a region image of the flaw frame with a region image of the target frame if the target frame is any adjacent frame; and obtaining the second image if all region images of flaw frames in the first image are replaced.

* * * * *